(12) United States Patent
Andrews et al.

(10) Patent No.: US 6,243,641 B1
(45) Date of Patent: *Jun. 5, 2001

(54) SYSTEM AND METHOD FOR DETECTING ENGINE CYLINDER MISFIRE

(75) Inventors: Eric B. Andrews; Axel O. zur Loye; Mark R. Stepper, all of Columbus, IN (US)

(73) Assignee: Cummins Engine Company, Inc., Columbus, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,548

(22) Filed: Oct. 19, 1998

Related U.S. Application Data

(63) Continuation-in-part of application No. 08/805,936, filed on Feb. 25, 1997, now abandoned, which is a continuation of application No. 08/479,721, filed on Jun. 7, 1995, now abandoned.

(51) Int. Cl.$^7$ .................................................. G01M 15/00
(52) U.S. Cl. .......................... 701/102; 73/115; 73/117.3; 123/436
(58) Field of Search .................................... 701/101, 102, 701/110, 111; 73/115, 116, 117.3; 123/436

(56) References Cited

U.S. PATENT DOCUMENTS

| | | | |
|---|---|---|---|
| 3,924,457 | * 12/1975 | Oshima et al. | 73/116 |
| 3,965,677 | * 6/1976 | Goto et al. | 73/117.3 |
| 4,366,793 | 1/1983 | Coles | 123/436 |
| 4,372,269 | 2/1983 | Coles | 123/436 |
| 4,475,506 | 10/1984 | Riordan . | |

(List continued on next page.)

FOREIGN PATENT DOCUMENTS

| | | |
|---|---|---|
| 38 35 285 A1 | 4/1990 | (DE) . |
| 41 16 574 C2 | 5/1994 | (DE) . |
| 41 16 518 C2 | 11/1996 | (DE) . |
| 694 10 331 T2 | 10/1998 | (DE) . |
| 0 288 056 A2 | 4/1988 | (EP) . |
| 0 618 436 B1 | 5/1998 | (EP) . |
| 2 301 898 | 3/1996 | (GB) . |

OTHER PUBLICATIONS

German Office Action dated Jul. 10, 2000 citing references.

*Primary Examiner*—George Dombroske
(74) *Attorney, Agent, or Firm*—Nixon Peabody LLP; Charles M. Leedom, Jr.

(57) ABSTRACT

A system and method in which the exhaust manifold pressure is measured by a single gauge-type pressure sensor positioned in the exhaust manifold to detect misfires in all cylinders of an internal combustion engine. The pressure sensor detects the exhaust manifold pressure and feeds a signal to a microcomputer via an analog-to-digital converter. A data processing device monitors the pressure waveform created by the data from the sensor to determine if a full or partial misfire occurs. If a cylinder suffers from a partial or complete misfire, the strength of the pressure pulse for that cylinder will be reduced, thus, allowing the data processing device to identify the misfire. The data processing device may determine a misfire by computing an average peak pressure for each combustion cycle, a pressure threshold as a function of engine speed and fuel consumption rate, and a minimum pressure value based on the difference between the average peak pressure and the pressure threshold. The data processing device may alternatively determine a misfire by first computing a coefficient of variation between an observed pressure pulse and the average peak pressure and then comparing the coefficient of variation with a pressure threshold to determine if at least a partial misfire has occurred.

55 Claims, 11 Drawing Sheets

U.S. PATENT DOCUMENTS

| | | |
|---|---|---|
| 4,543,934 | 10/1985 | Morita et al. . |
| 4,567,755 | 2/1986 | Ootsuka et al. .................... 73/117.3 |
| 4,683,856 | 8/1987 | Matsuura et al. . |
| 4,776,312 | 10/1988 | Yoshioka et al. . |
| 5,044,195 * | 9/1991 | James et al. ........................ 73/117.3 |
| 5,095,742 * | 3/1992 | James et al. ........................... 73/116 |
| 5,109,825 | 5/1992 | Joos et al. ............................. 123/479 |
| 5,116,259 | 5/1992 | Demizu et al. ..................... 73/117.3 |
| 5,127,262 | 7/1992 | Demizu et al. ..................... 73/117.3 |
| 5,193,513 | 3/1993 | Marko et al. ....................... 73/117.3 |
| 5,287,283 | 2/1994 | Musa ..................................... 123/690 |
| 5,381,771 * | 1/1995 | Leshner ................................ 123/436 |

* cited by examiner

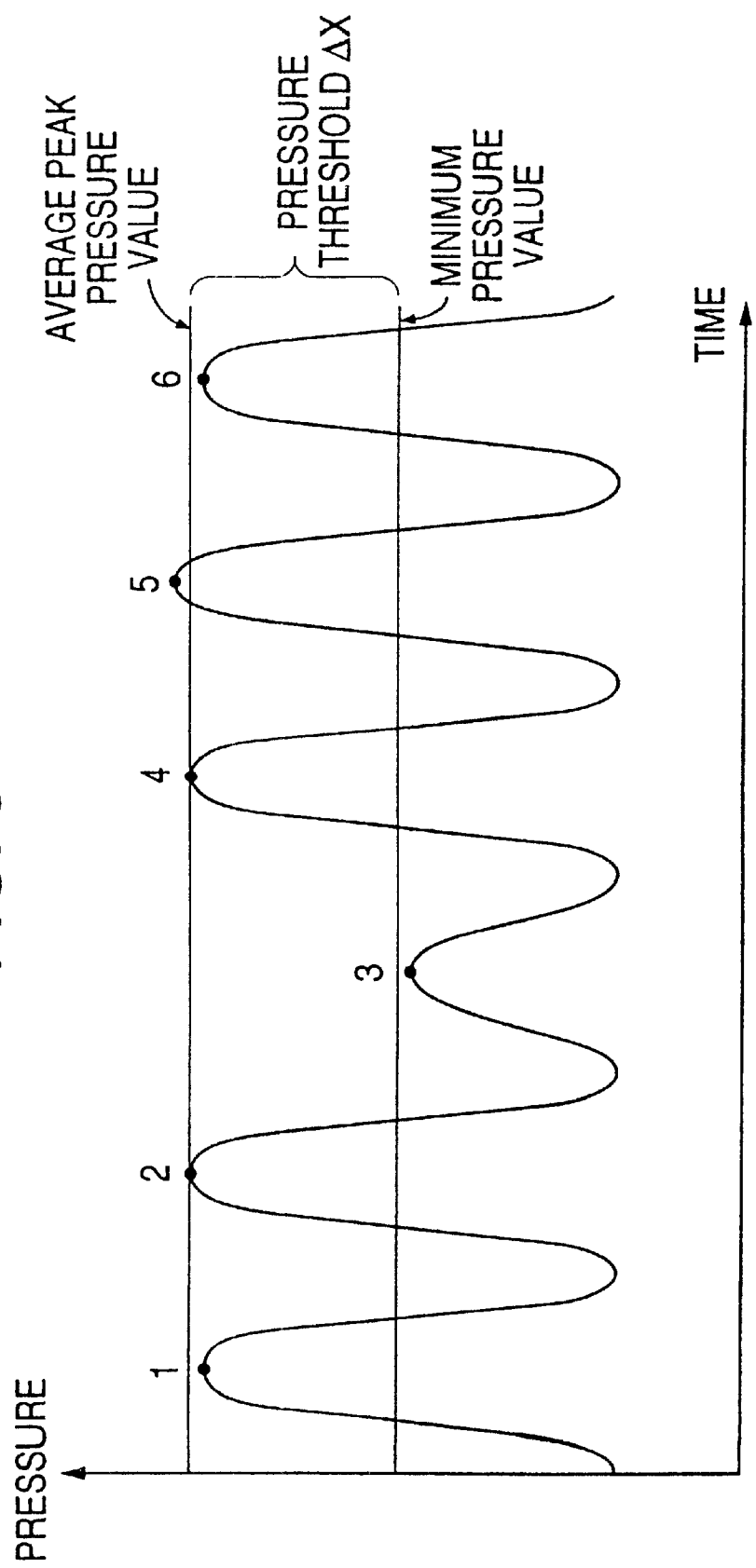

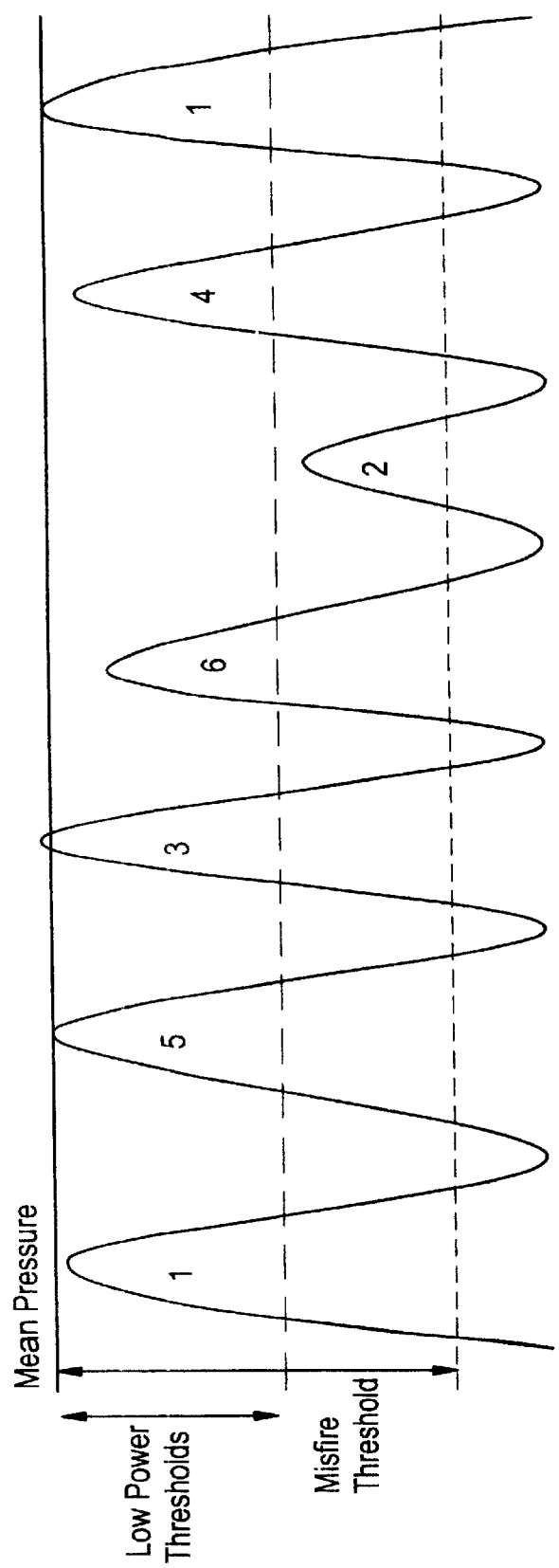

SYSTEM AND METHOD FOR DETECTING ENGINE CYLINDER MISFIRE

This application is a continuation-in-part application of U.S. patent application Ser. No. 08/805,936 filed Feb. 25, 1997, now abandoned, which is a continuation of U.S. patent application Ser. No. 08/479,721 filed Jun. 7, 1995, now abandoned.

TECHNICAL FIELD

This invention is generally directed to the field of internal combustion engines and more particularly to a system and method for detecting engine cylinder misfires in such internal combustion engines.

BACKGROUND

In order to meet the demand for increased internal combustion engine efficiency and improved emissions control, engine manufacturers have developed techniques for constantly monitoring the operational characteristics of the engine to determine when engine operation is abnormal or outside of prescribed tolerances. This is particularly true with advanced engines which are designed to meet or exceed state-of-the art fuel economy and emissions control. Even more importantly, an internal combustion engine can be damaged, requiring costly repairs or earlier than normal overhaul, if it is operated in a non-optimal or malfunctioning condition.

One such characteristic of engine operation is that of an engine cylinder misfire. An engine cylinder misfire can occur due to failed ignition of the fuel-air mixture within an engine cylinder (lack of combustion) or the incomplete ignition of the fuel-air mixture caused by too lean of a mixture (incomplete combustion). Each of these misfires affect engine performance and can result in increased emissions and reduced fuel economy.

Damage to a vehicle can occur if an engine misfire condition is not detected and corrected. For example, many internal combustion engine driven vehicles employ catalytic converters to reduce the amount of pollution generated by the vehicle exhaust. Due to the structure and operation of catalytic converters, a large amount of heat is usually present within the converter itself. Therefore, where there is a lack of combustion or incomplete combustion, fuel is passed through the exhaust to the catalytic converter where, as a result of the heat in the converter, it combusts. The additional heat generated from this direct combustion in the catalytic converter quickly destroys the converter.

Various approaches have been employed in the prior art to detect engine misfires. One such technique positions a pressure transducer within the exhaust path of an internal combustion engine. Generally, the pressure transducer converts exhaust gas pressure to an electrical signal that can be processed to detect engine cylinder misfire, but none of the prior art methods take into account a multitude of present operating conditions of an internal combustion engine including fuel rate, engine speed, and coolant temperature, in combination with the output of the pressure transducer to detect an engine misfire.

For example, U.S. Pat. No. 5,193,513 to Marko et al. discloses a misfire detection system for use in an internal combustion engine in which an exhaust pressure sensor, a position sensor for sensing the rotational position of the engine, and an analog-to-digital converter for digitizing an analog signal received from the pressure sensor are employed. The digitized pressure data is compared using a data classifier (i.e. pattern recognition system) that is trained to recognize data signatures of individually misfiring cylinders. To train the classifier, the engine is operated in a service bay and engine data is collected during both intentionally induced misfires and under normal conditions. This data is then presented to the data classifier in a training operation. Engine misfire detection systems such as the one disclosed in Marko, et al., however, fail to compare a multitude of engine operation characteristics to sensed engine cylinder peak pressures as a way of detecting partial or complete engine misfires.

Using sampled engine operation data retrieved from sensors located within or on the internal combustion engine to detect engine speed, coolant temperature and fuel rate, for example, would allow a user to monitor and detect possible engine misfires in real-time during the operation of the vehicle. This would be accomplished by comparing the engine operation characteristics with the sensed cylinder exhaust pressure for each combustion cycle of an internal combustion engine. The prior art provides a variety of methods for detecting engine cylinder misfire for a combustion cycle, but fails to rely on engine operation characteristics in calculating partial or complete engine cylinder misfires. For example, U.S. Pat. No. 3,965,677 to Goto et al. discloses a misfire detecting apparatus in which the suction pressure of an engine is detected and used to calculate a threshold level wherein a cylinder misfire is declared if the exhaust gas pressure exceeds this threshold level. U.S. Pat. No. 3,983,754 to Deguchi et al. likewise discloses an apparatus for detecting misfires in a multi-cylinder internal combustion engine in which pressure responsive devices are provided in the branches of the exhaust manifold or exhaust ports and the outputs of these devices are compared to detect an engine cylinder misfire. U.S. Pat. No. 4,567,755 to Ootsuka et al. discloses an ignition/misfire detector for an internal combustion engine in which a pressure detection unit is used to detect changes in combustion pressure in the engine and an ignition/misfire detection unit is used to determine the occurrence of an engine ignition misfire. Finally, U.S. Pat. No. 3,924,457 to Oshima et al. discloses a misfire detecting device for an internal combustion engine in which an exhaust gas introducing tube is provided adjacent to an exhaust port in an exhaust passage to provide exhaust gas to a pressure transducer disposed at one end of the exhaust gas introducing tube to determine pressure fluctuation which may indicate a possible engine cylinder misfire. All of these methods of detecting engine cylinder misfire fail to employ a multitude of present engine operating conditions to provide an efficient engine cylinder misfire detection system.

A novel engine cylinder misfire detection system and improvement over the prior art is disclosed in U.S. Pat. No. 5,392,642 to Tau, a patent which is assigned to Cummins Engine Company, Inc., the same assignee of the present invention. This patent discloses an engine cylinder misfire system that uses a sensor to monitor an engine cylinder for all engine cycles and to provide an average of the detected output for each cylinder. Furthermore, the engine speed and fuel rate of the internal combustion engine are used to provide a more effective engine cylinder misfire detection system. Nevertheless, the invention disclosed in the Tau patent is directed to a system for detecting low power in at least one cylinder of a multi-cylinder engine. Furthermore, this application discloses the use of multiple pressure sensors, specifically one sensor for each cylinder to provide engine misfire detection.

Upon sensing a multitude of engine operation characteristics in real time, including engine exhaust pressure, a suitable algorithm must be formulated to process the electrical signals generated by the sensors into a readable form and to perform a series of operations to determine a partial or complete misfire. For example, in computing when an engine cylinder misfire has occurred, the prior art suggests a method in which a peak value and an average value is used for a sensed condition to detect the malfunction of an engine cylinder. For example, U.S. Pat. No. 5,144,929 to Hosoya et al. discloses an apparatus which calculates a peak level of a sensed condition and an average level of the sensed condition and uses those values to generate a peak threshold level using a peak threshold calculator. The average level is amplified using the peak threshold calculator and an offset value is added to this value to provide the peak threshold level. A subtractor is then used for making a comparison between the peak level and the peak threshold to provide a derivation level which is used to determine whether a malfunction has occurred in the engine cylinder. Although Hosoya et al. appears to disclose a method for utilizing sensed operating data to determine whether a malfunction in an engine cylinder has occurred, it fails to provide an algorithm that processes engine operating characteristics such as fuel rate, coolant temperature and engine speed in combination with a sensed engine exhaust pressure to provide a reliable engine cylinder misfire detection system and method.

Therefore, the inventor has recognized a need for an engine cylinder misfire detection system that samples engine operating characteristics in real time and utilizes these characteristics in combination with a sensed engine cylinder pressure value for each combustion cycle of an internal combustion engine to determine whether an engine cylinder is operating improperly. A reliable engine cylinder misfire detection system that provides this function is necessary to increase engine performance, decrease engine emissions and improve fuel economy.

SUMMARY OF THE INVENTION

It is an object of the invention to provide an improved system and method for determining when an engine cylinder misfire occurs in an internal combustion engine.

It is a still further object of the present invention to provide a system and method for accurately and reliably detecting an engine cylinder misfire by analyzing exhaust manifold pressure to determine when an engine cylinder misfires occurs.

It is another object of the present invention to provide a system and method for accurately and reliably detecting either a complete lack of combustion or a partial combustion within an engine cylinder.

It is still another object of the present invention to provide a system and method which calculates the average peak pressure for a combustion cycle to determine whether a possible misfire has occurred.

It is yet another object of the present invention to provide a system for reliably detecting erratic and random misfires.

It is a further object of the present invention to provide a system and method for reliably detecting engine cylinder misfires in any operating state of the engine.

It is still a further object of the present invention to provide a system for determining an internal combustion engine cylinder misfire that operates using a single pressure sensor for any number of engine cylinders.

It is yet a further object of the present invention to provide a system and method for detecting an internal combustion engine misfire in which a single sensor is employed to detect engine misfires in an engine having multiple exhaust manifolds.

It is another object of the present invention to provide a system and method for detecting an engine cylinder misfire by comparing a current peak pressure for an engine combustion cycle with a running average peak pressure sensed from previous engine combustion cycles.

It is still another object of the present invention to provide a system and method for accurately detecting an engine cylinder misfire using a wide range of engine operation parameters to calculate an optimum threshold value that is compared to an observed value for use in determining individual cylinder misfires.

It yet another object of the present invention to calculate a pressure threshold based on at least one or more of sensed engine speed, fuel rate, and coolant temperature wherein sensed current peak exhaust pressure is compared to the average peak pressure minus an optimum threshold value to detect an engine cylinder misfire.

It is a further object of the present invention to provide a system and method for detecting an engine cylinder misfire that compares the difference between an observed peak pressure value and the running average of peak pressures to an optimum threshold value as a way of detecting an engine cylinder misfire.

It is still a further object of the present invention to provide a system and method for detecting an engine cylinder misfire that performs statistical comparisons of peak and mean pressure readings between subsequent firings of the same cylinder as a way of detecting an engine cylinder misfire.

These and other objects are achieved by a system and method in which the exhaust manifold pressure is measured by a single pressure sensor to detect misfires in all cylinders of an internal combustion engine. Specifically, a pressure sensor, such as a piezoelectric sensor or other gauge type sensor, is mounted in the exhaust manifold upstream of the turbocharger to monitor the exhaust manifold pressure relative to the ambient atmospheric pressure. During a normal combustion cycle, when the exhaust valve opens, the in-cylinder pressure is significantly higher than the exhaust manifold pressure, causing pressure pulses in the exhaust manifold that correspond to each exhaust value opening. A normal combustion cycle is a period in which all engine cylinders have fired or have attempted to fire one time. After sampling the peak pressure pulses created by each exhaust valve opening, the pressure sensor signal is digitized by an analog-to-digital converter and sent to a processor to be analyzed and stored in memory.

When a combustion cycle is completed, the running average peak pressure for all of the engine cylinders is calculated. The running average peak pressure is determined by averaging the current peak pressure value (for a single cylinder) with the previous average of peak pressure values (for two or more cylinders) sensed during the combustion cycle. If a cylinder suffers from a partial or complete misfire, the strength of the pressure pulse for that cylinder will be reduced. To actually detect an engine cylinder misfire, the processor calculates a threshold value as a function of at least one of the engine speed and fuel consumption rate. Depending on the specific embodiment, the threshold value is either a numeric value, a percentage or an absolute pressure which is compared to a value observed under current operating conditions to determine the existence of a misfire condition. In one embodiment, a pressure threshold is calculated as a percentage or an absolute pressure which is subtracted from the running average peak pressure to determine a minimum pressure value. If the exhaust manifold pressure for any cylinder is below the minimum pressure value, a misfire is declared.

BRIEF DESCRIPTION OF THE DRAWINGS

FIG. 5 illustrates a threshold and average peak pressure value used to detect an engine misfire in accordance with the present invention;

FIG. 5a illustrates the use of a misfire threshold and low pressure threshold to detect an engine misfire in accordance with the present invention;

DETAILED DESCRIPTION OF THE PREFERRED EMBODIMENT

Figure 1:
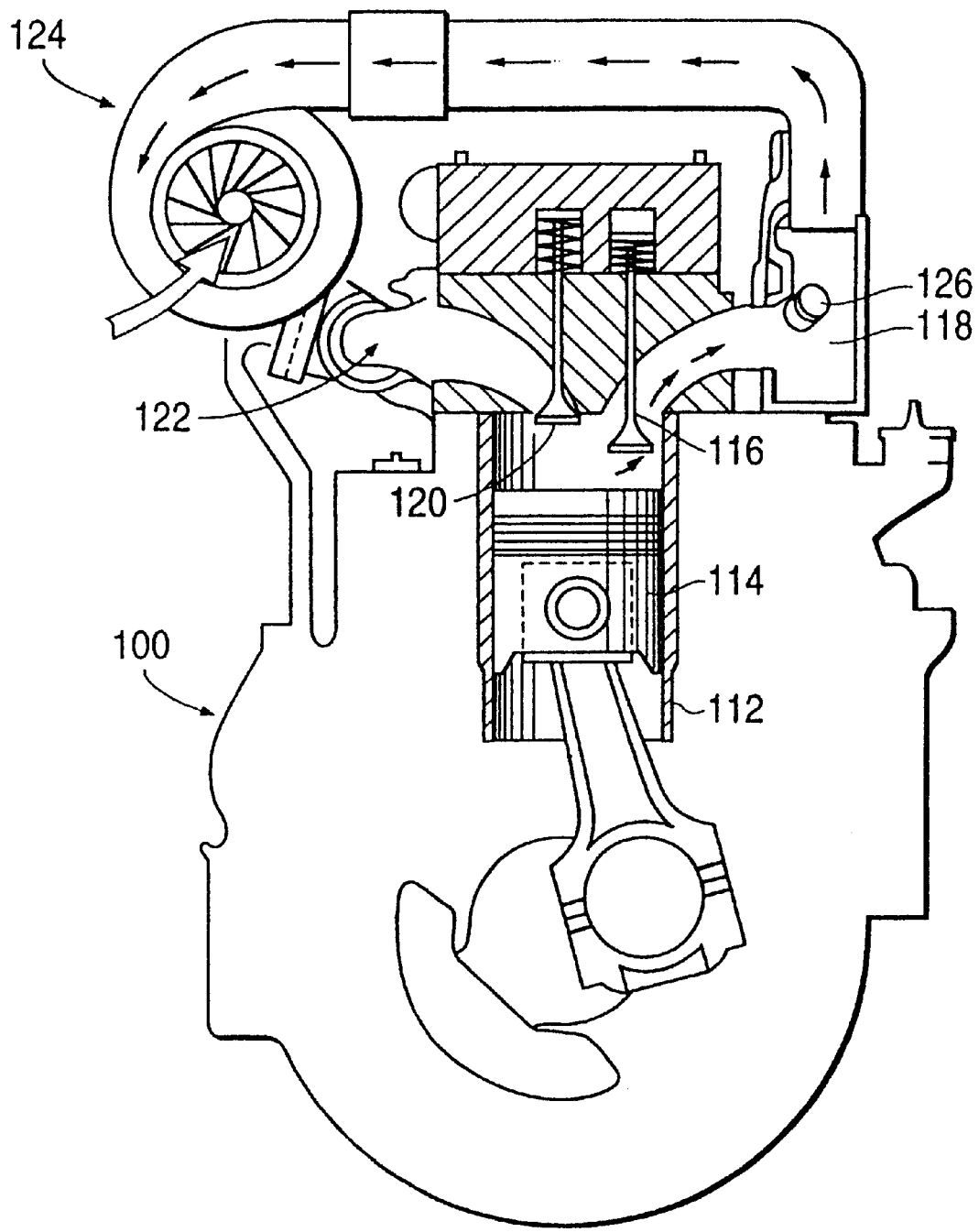
FIG. 1 depicts a pressure sensor located in an exhaust manifold of an internal combustion engine in accordance with the present invention.

FIG. 1 illustrates a preferred embodiment of the present invention. In particular, the preferred embodiment includes a pressure sensor 126 located in an exhaust manifold 118 of an internal combustion engine. Internal combustion engine 100 comprises a cylinder 112, a piston member 114, an exhaust valve 116, an exhaust manifold 118, an intake valve 120, an intake port 122, a turbocharger 124, and a pressure sensor 126. In one embodiment, internal combustion engine 100 will operate in a natural gas environment. The internal combustion engine 100, however, may also operate using diesel or gasoline fuel. Moreover, the present invention may be developed to meet the requirements of CARB OBD II set by the California Regulations Board.

In a natural gas environment, the spark-ignited engine will operate at a steady state speed while the fuel is slowly leaned out until an engine misfire occurs. After the misfire occurs, the fuel is then minimally increased to a level near the misfiring point to enable the engine to run as lean as possible. By operating the natural gas engine near the misfire point, the fuel economy is greatly improved.

Pressure sensor 126 is mounted in exhaust manifold 118 to monitor the exhaust manifold pressure relative to the ambient atmospheric pressure. Pressure sensor 126 is preferably a gauge type sensor, such as a piezoelectric sensor or a capacitive ceramic sensor, which is able to withstand the extreme temperatures of the gases in exhaust manifold 118. One skilled in the art, however, will appreciate that any sensor with the above characteristics may be used.

During a combustion cycle, when the exhaust valve 116 opens, the in-cylinder pressure is significantly higher than the exhaust manifold pressure. A combustion cycle is a period during which all engine cylinders have fired or have attempted to fire one time. Consequently, a pressure pulse is created within the exhaust manifold for each combustion cycle of the engine. As the exhaust gases are released from each cylinder, they are routed downstream toward the turbocharger 124. Pressure sensor 126 is preferably located upstream from the turbocharger at the end of exhaust manifold 118, as shown in FIG. 1.

Figure 6:
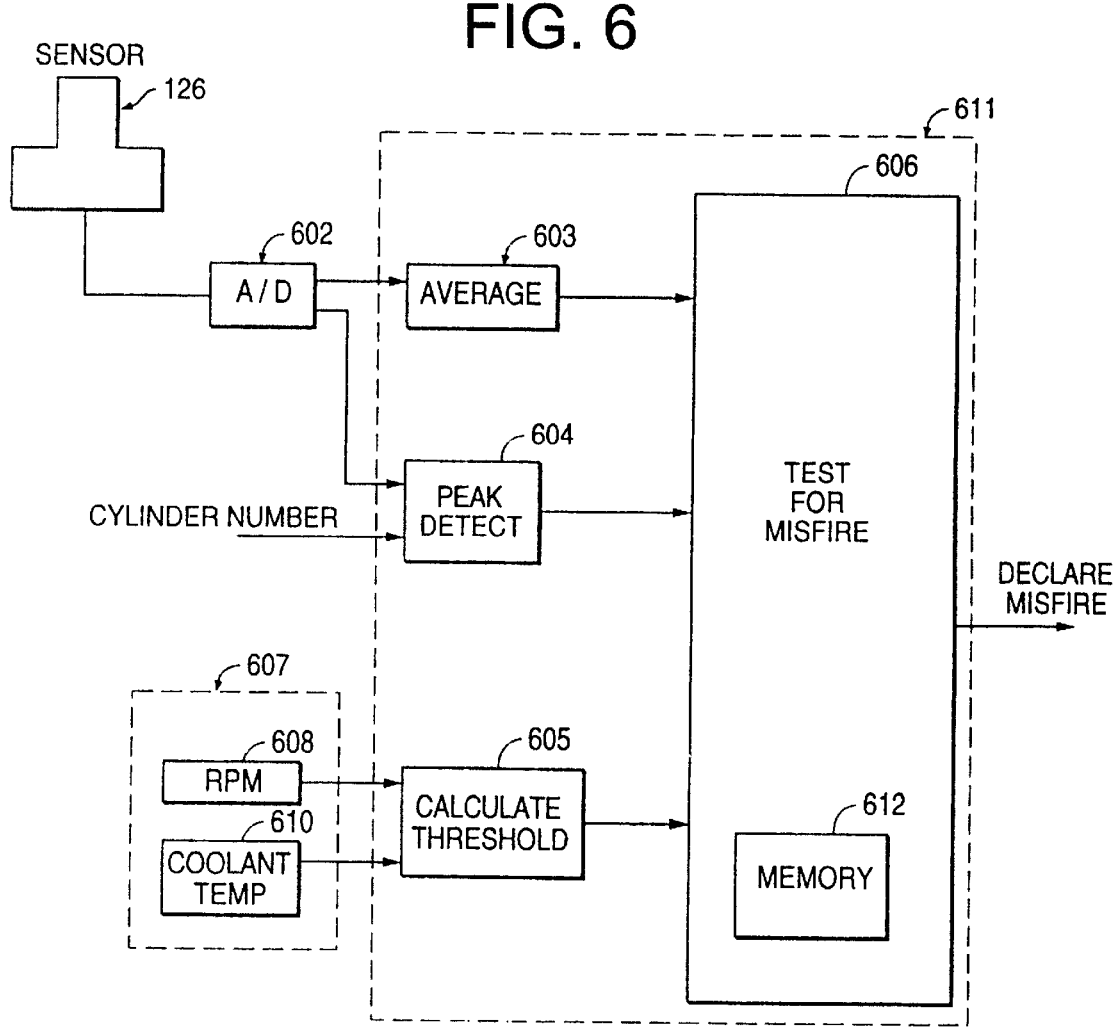
FIG. 6 is a block diagram of a system that can be used to detect an internal combustion engine misfire in accordance with the present invention.

Due to this location, the single pressure sensor 126 can be used to provide pressure data for each cylinder of the engine. The engine cylinders fire sequentially during a combustion cycle causing exhaust gases to be released at different time intervals. As each cylinder releases exhaust gases, the pressure sensor 126 monitors and samples the pressure pulse created in the exhaust manifold. Subsequently, the pressure pulse peak is determined by processor 611 in peak pressure detection module 604 of FIG. 6. The sampled pressure pulse peak data is digitized by an analog-to-digital (A/D) converter 602 and routed through peak pressure detection module 604 to processor 611, as shown in FIG. 6, where it is stored in memory 612 for later processing.

Figure 2A:
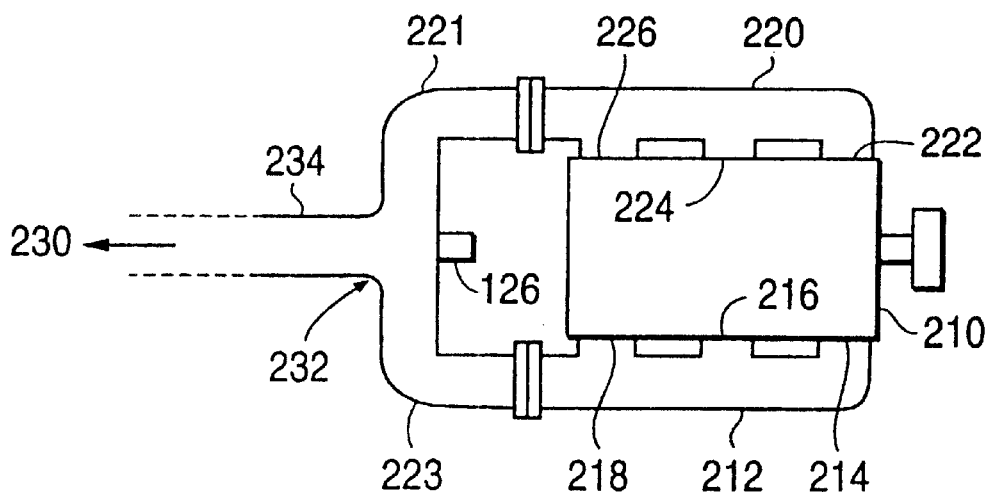
FIG. 2a illustrates an embodiment of the present invention in which the pressure sensor is located in an exhaust gas system downstream from the exhaust manifold.
Figure 2B:
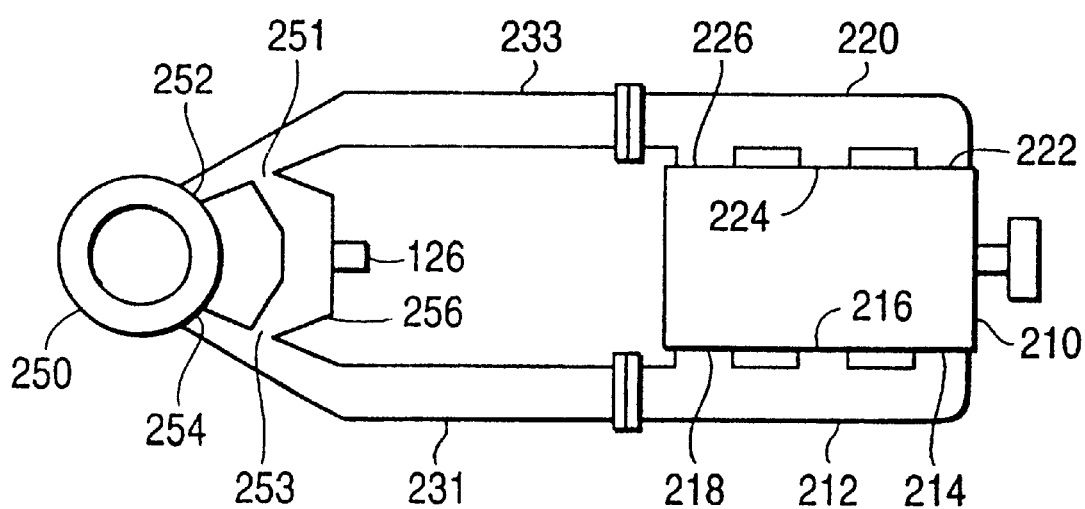
FIG. 2b illustrates another embodiment of the present invention in which the pressure sensor is located in a twin-entry turbo exhaust gas system downstream from the exhaust manifold.

FIGS. 2a and 2b illustrate the position of the pressure sensor 126 within the exhaust manifold of an engine in two alternative embodiments of the present invention. FIG. 2a shows an engine block 210 which houses six cylinders of an internal combustion engine. Exhaust ports 214, 216, and 218 extend outward into exhaust manifold 212. Similarly, exhaust ports 222, 224, and 226 extend into exhaust manifold 220. During the combustion cycle, the exhaust gases are released into exhaust manifolds 212 and 220 and are ultimately routed to port 230 via exhaust paths 221, 223 and 234. Pressure sensor 126 is mounted slightly offset from junction 232 where exhaust paths 221 and 223 connect, as shown in FIG. 2a. At this position, the pressure sensor 126 can accurately detect pressure pulses from each cylinder based on the sequence of cylinder firing. Because the exhaust gas pressure pulses occur at different times, the pressure sensor 126 can detect the peak pressure for each cylinder after firing. After pressure sensor 126 senses a pressure pulse in the exhaust manifold, resulting from the first cylinder firing in a combustion cycle, the sensed data is immediately digitized and stored in the processor memory 612 (described in greater detail below with reference to FIG. 6) with the corresponding cylinder number which in this case would be "one." For each subsequent cylinder firing, the operation of the system as described above remains unchanged. The stored pressure data is then used to determine the occurrence of a complete or partial misfiring of a particular cylinder by calculating the running average of the sensed peak pressures for a complete combustion cycle and an optimum pressure threshold as discussed later with reference to FIGS. 6 and 7.

FIG. 2b illustrates another alternative embodiment of the present invention in which the pressure sensor is located in a twin-entry turbo exhaust gas system downstream from the exhaust manifold. Extending outward from engine block 210 are a series of exhaust ports 214, 216, 218, and 222, 224, 226 which are connected to exhaust manifolds 212 and 220, respectively, as shown in FIG. 2b. Exhaust manifolds 220 and 221 are connected to exhaust passages 231, 233 which connect to turbocharger 250 at junctions 252 and 254. Pressure sensor 126 is positioned in a passage 256 which connects exhaust passages 231 and 233. The openings 251 and 253 leading into passage 256 from the exhaust passages 231 and 233 are small to prevent the leakage of exhaust gases from one exhaust passage to the other.

The sensor 126 must be offset from the center of passage 256 to reduce the possibility of standing waves being generated therein. These standing waves could alter the pressure readings undesirably. In operation, the exhaust manifold gases are routed downstream toward the turbocharger. As the gases reach junctions 252 and 254, a pressure pulse is created in passage 256 which is sensed by pressure sensor 126. Because the pressure sensor is not positioned in the exhaust manifold as shown in FIG. 1, the sensor must be calibrated accordingly to detect pressure pulses that may have weakened while traveling through exhaust passages 231 and 233. This alternative embodiment of the present invention is desirable because only a single pressure sensor is needed to detect pressure pulses in both exhaust passages 231 and 233.

Figure 3:
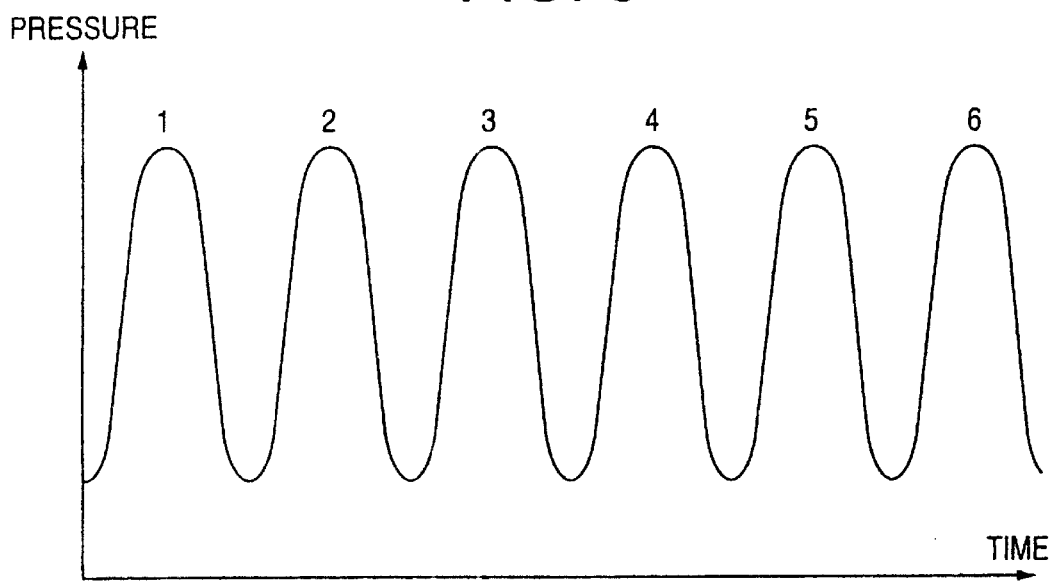
FIG. 3 illustrates the output from the pressure sensor in a normally operating internal combustion engine.

FIG. 3 illustrates a graph of the typical manifold peak pressure detected by pressure sensor 126 for the engine cylinders when firing properly. Each peak shown in FIG. 3 corresponds to the opening of an exhaust valve of an internal combustion engine and the release of exhaust gases into the exhaust manifold. Once the peak pressures for a specific combustion cycle are sampled and stored in memory 612, processor 611, shown in FIG. 6, determines a running average peak exhaust pressure for all cylinders during a single combustion cycle by adding the pressure peak values and dividing the sum of these values by the number of engine cylinders. For example, if the sum of the peak pressure values for a six cylinder engine is 600 pounds per square inch (PSI), then the average peak pressure for this combustion cycle is 100 PSI. This data is later compared to a pressure threshold to determine the occurrence of a complete or partial misfire. The calculation of the pressure threshold is a function of engine speed and the fuel consumption rate at load and will be addressed in detail with reference to FIGS. 6 and 7.

Figure 4:
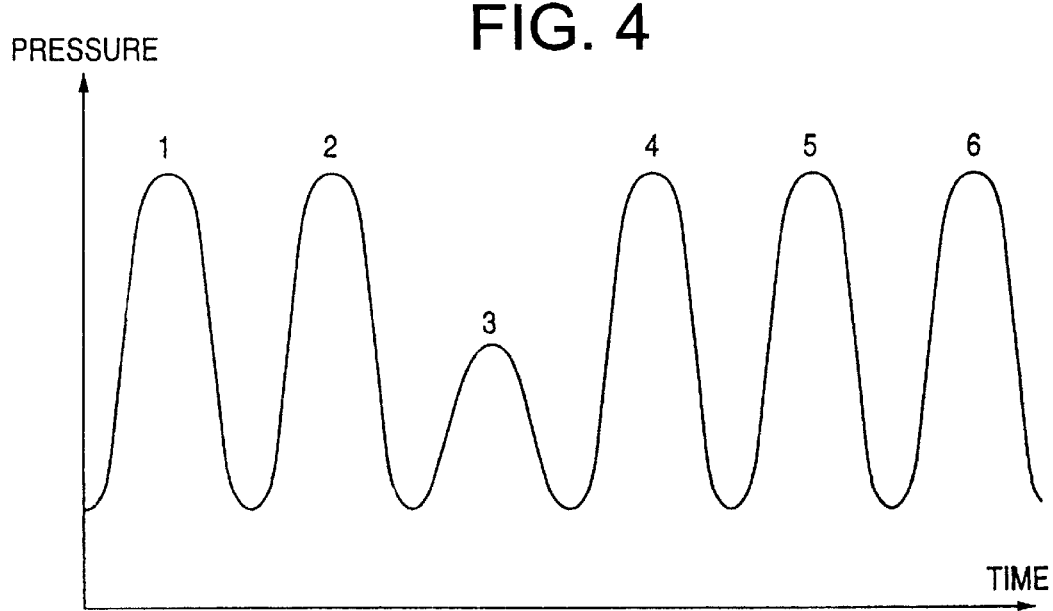
FIG. 4 illustrates the output from the pressure sensor when one cylinder of the internal combustion engines misfires.

Whenever a complete or partial misfire occurs, the pressure sensor 126 does not detect a pressure pulse or detects a weak pressure pulse from one or more cylinders. As an example, FIG. 4 illustrates a graph of the sampled exhaust manifold pressure with at least a partial misfiring of cylinder "three."

The average peak pressure is determined by processor 611, as shown in FIG. 6, which keeps a running average of the peak exhaust manifold pressure for each cycle. The running average is determined by averaging the previously calculated peak pressures, for all cylinders or several cylinders, with the current sampled peak pressure for a single cylinder firing. If complete or partial misfiring occurs, the average peak exhaust manifold pressure for the combustion cycle will be lower than when all cylinders are firing properly. Consequently, a possible misfire may be detected by comparing a recently sampled peak pressure value (for one cylinder) with the running average peak pressure (for two or more cylinders).

A partial or complete misfire will be declared if the peak pressure for any cylinder is below a minimum pressure value that is calculated by subtracting the pressure threshold from the running average of peak pressures. FIG. 5 illustrates a graph of the average peak pressure and the pressure threshold in relation to the detected peak pressure for each cylinder. The dots at the top of each pressure wave represent the peak pressure sampled by pressure sensor 126. The graph shows that the peak pressure for cylinder "three" is below the minimum pressure value which is the difference between the pressure threshold and the average peak pressure. Thus, in this instance, a misfire would be declared for cylinder "three." This detection scheme is particularly useful when the pressure detected from a cylinder firing event is significantly less than the other observed pressure values, indicative of a complete misfire. Unfortunately, it is uncharacteristic for a cylinder of an internal combustion engine to suddenly drop from an optimum performance state to a misfire state in a short period of time. It is more likely that the performance of an engine cylinder will slowly decline over a period of time until it eventually fails to combust at all. The net effect is that by the time an engine cylinder has degraded to this degree, it has already had a deleterious effect on a number of key engine components.

A variation on this particular method is illustrated in FIG. 5a where at least a partial misfire is declared when the difference between an observed peak pressure value and the running average of peak pressures is greater than an optimum pressure difference. In FIG. 5a, the peak pressure of cylinder two is above the misfire threshold, and consequently is not considered a misfire. However, the difference between the mean pressure and the peak pressure of cylinder two exceeds the acceptable threshold for a normal combustion event and therefore, cylinder two is flagged as having low power. As is obvious from FIG. 5a, the low power threshold is similar to, but closer in value to the mean peak pressure than the misfire pressure threshold.

In this case, a malfunctioning cylinder will be identified and the problem corrected much faster than in the previous case. This detection scheme is additionally effective at identifying random misfire events (i.e., those occurring at least once every 5 minutes). Such widely separated misfire events usually do not have a measurable effect on the average peak pressure value and therefore are difficult to identify by those systems that simply monitor average peak pressure as a means for identifying a misfire condition. This particular misfire detection system however, is only marginally capable of identifying erratic misfire events (i.e., those occurring once every few seconds). The difficulty experienced by this system in identifying such events lies in the fact that as erratic low power (or misfire) events occur, the running average peak pressure value decreases. This correspondingly results in a decrease of the misfire and low power thresholds since they are both biased off the running average peak pressure value. As the low power and misfire thresholds decrease, so does the ability of the system to detect low power and misfire events.

A misfire detection scheme utilized in yet another embodiment of the present invention performs statistical comparisons of peak and mean pressure readings between subsequent firings of the same cylinder to determine the existence of a low power or misfire event. By limiting its determination of a cylinder misfire event to the combustion activity occurring in an individual cylinder, this system is able to accurately characterize a combustion event regardless of the combustion efficiency of the other cylinders, or the running average peak pressure value. To identify a misfire event, this detection scheme compares the coefficient of variation (standard deviation÷mean) of the peak pressure values in a particular cylinder with an optimum coefficient of variation value based on at least one or more of sensed engine speed, fuel rate, and coolant temperature. Next, it compares a running average of peak pressures (for two or more cylinders) with the observed peak pressure value (for one cylinder). If the coefficient of variation is greater than the threshold value and the running average of peak pressures is greater than the observed peak pressure value, then a misfire event is declared. This two-part test ensures that the system accurately identifies a low power event and that a low power event will be reported even when the running average of peak pressures gradually declines due to a number of erratic misfire events.

Figure 5B:
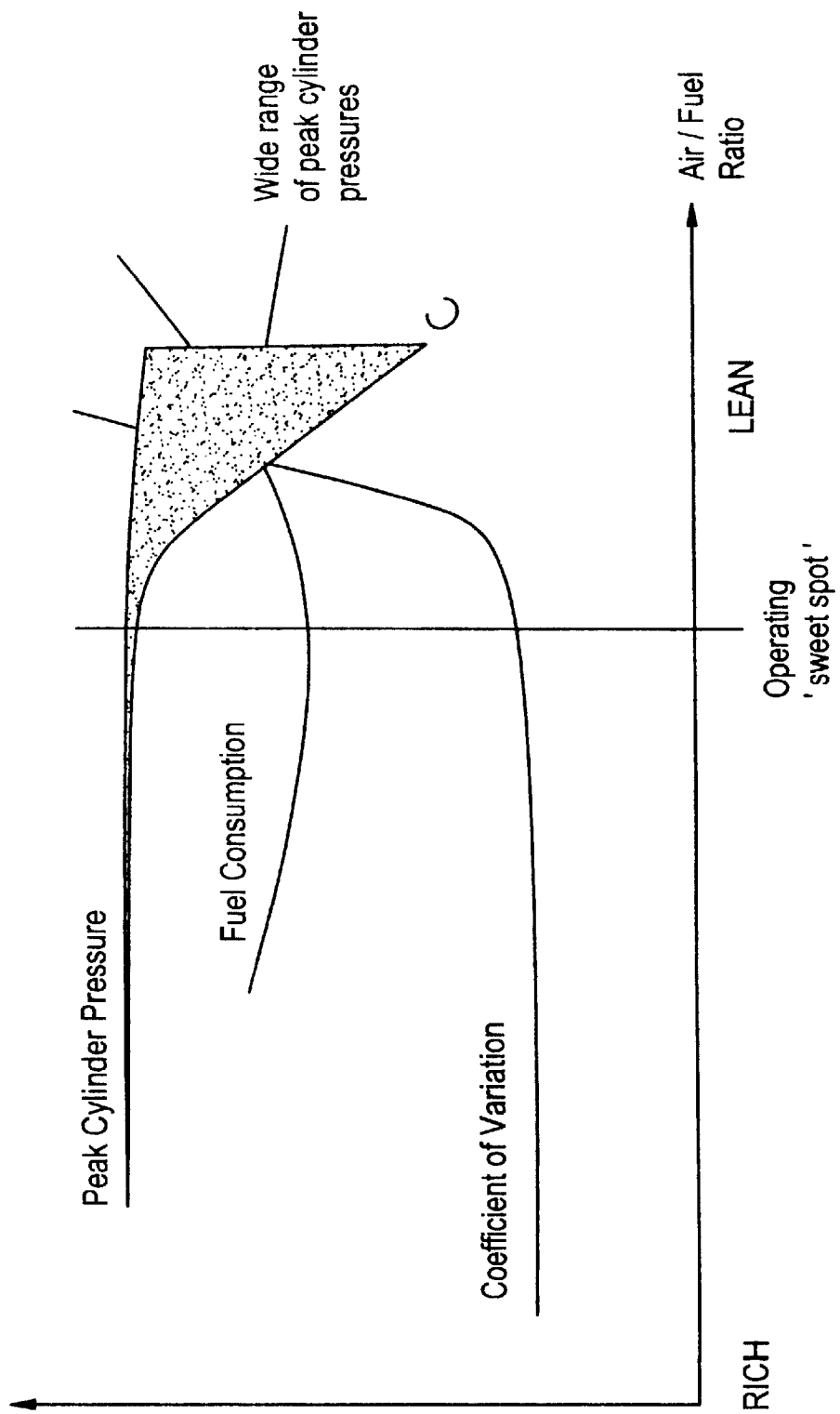
FIG. 5b illustrates the relationship between peak cylinder pressure, fuel consumption and the coefficient of variation.

FIG. 5b graphically depicts the relationship between peak cylinder pressure, fuel consumption and the coefficient of variation (COV). As the engine is leaned out, the coefficient of variation gradually increases to a point where air/fuel ratio and the peak cylinder pressure are optimum. This point is known as the "operating sweet spot". As the air/fuel ratio is made leaner, the coefficient of variation begins to increase precipitously. The coefficient of variation is a statistical measure of the conformity between a number of data points. It is equal to the standard deviation÷the mean. As observed peak pressure values for a cylinder deviate from the average peak pressure for that cylinder, the standard deviation ($\sigma$) increases. As the standard deviation increases, so does the coefficient of variation. Since the coefficient of variation is always reported as a positive value, it is unclear whether an increase in the coefficient is due to wide pressure deviations below the mean (indicating a misfire event) or if the deviations are due to wide pressure variations above the mean (indicating a high power event). This uncertainty necessitates the second test that determines whether the observed peak pressure value is below the mean, or above it. Unfortunately, this system is subject to false alarms particularly when the engine has not operated in a steady state for a period of time. For example, when the engine is restarted after a period of inactivity, unburned fuel remaining in a cylinder may have an indeterminate effect on the observed peak pressure value resulting in erroneously reported occurrences of low power and misfire events.

In a preferred embodiment of a misfire detection system, it would be ideal for a system to accurately identify erratic misfire events as well as random misfire events in any operating state of the engine.

FIG. 6 is a block diagram of the engine misfire detection system in accordance with the preferred embodiment of the present invention. The system is comprised of a processor 611 that is further comprised of an average pressure calculation module 603, a peak pressure detection module 604, an optimum threshold calculation module 605 and a misfire detection module 606. Outputs from modules 603, 604 and 605 are connected to the input of misfire detection module 606. The misfire detection module 606 is also comprised of processor memory 612 for storing data. Processor 611 is a microprocessor, such as a Motorola 68000 microprocessor, which may be embodied in a vehicle control system already installed on a vehicle, or added as a separate processing feature. Memory 612 may be random access memory (RAM) or any type of programmable memory. The system is additionally comprised of a pressure sensor 126 coupled to an analog-to-digital converter 602 that is further coupled to the average pressure calculation module 603 and the peak pressure detection module 604. Finally, the system is comprised of engine operation sensors 607 coupled to the input of the optimum threshold calculation module 605. The engine operation sensors 607 include an engine speed sensor 608 and coolant temperature sensor 610 which sample each of these engine operation functions.

In operation, the pressure sensor 126 samples the peak pressure in the exhaust gas manifold for each cylinder during a combustion cycle. To ensure the accuracy of the peak pressure values, there must be synchronism between the sampling time and the actual time that the pressure within the exhaust manifold has peaked with respect to each cylinder firing. To determine the appropriate sampling time, a sensor is used to monitor the position of the engine cam shaft or crank shaft at a given time. The sampling time of pressure sensor 126 must correspond to each cylinder firing during a combustion cycle. The cam sensor is used to determine which cylinder is firing by sensing the cam gear at top-dead-center (TDC) and subtracting off 60 degrees of revolution, for example, to estimate the firing time for each cylinder.

Once the firing time is determined, the transmission or propagation delay for the exhaust gas pressure waves released from each cylinder upon combustion must be calculated. The transmission delay is measured by calculating the period of time between the firing of the cylinder and the moment at which the peak exhaust gas pressure waves reach pressure sensor 126. This time period varies based on the type of engine, location of the cylinders, pressure sensor position, and other similar factors. Consequently, the transmission delay is a fixed time period that is provided on a chart or table with respect to each engine design. The transmission delay time period is programmed into processor 611 at the pre-production phase of the engine to enable the sensors to sample the peak pressures in the exhaust manifold at the appropriate time to ultimately determine possible engine cylinder misfire.

To ensure the accuracy and integrity of the peak pressure readings, pressure sensor 126 may take multiple samples for each cylinder firing. By taking multiple samples, noise is reduced to improve the accuracy of the sampled peak pressure signal. In this embodiment, pressure sensor 126 samples the peak pressure repeatedly during the time period where the exhaust manifold pressures have peaked. The peak pressure for a particular cylinder firing would be the highest pressure sensed from the multiple samples and is determined in peak pressure detection module 604.

An alternative method of determining the peak pressure in peak pressure detection module 604 is to create a digital image of the entire manifold pressure waveform for each cylinder firing and then determine the peak pressure signal based on the highest pressure reading sample over the entire pressure waveform. This method provides an accurate account of the peak pressure signal over the waveform period and would alleviate the need for taking multiple samples and for determining transmission delays as described above.

The sampled pressure data is digitized in an analog-to-digital converter 602 which transforms an analog data signal into a digital data signal. The digitized data signal is then routed through modules 603 and 604 to processor 611 to calculate both the average peak pressure and the current peak pressure, respectively. In average pressure calculation module 603, the sampled exhaust peak pressure values for a complete combustion cycle are averaged and stored in the processor memory 612. Processor 611 develops a running average for each cylinder firing by continuously storing the average peak exhaust pressures in memory 612. Processor 611 compares the average peak exhaust gas pressure generated during a combustion cycle with the current peak exhaust gas pressure of a cylinder to monitor any pressure changes.

The peak pressure for each cylinder is determined in peak pressure detection module 604. When pressure sensor 126 monitors the exhaust gas pressure released from a cylinder, it samples the highest pressure detected for each cylinder during a combustion cycle. This peak pressure data is stored in peak pressure detection module 604 along with the corresponding cylinder number. The cylinder number for combustion cycle is determined by a cam angle detector which detects a specified cam angle for each rotation of the cam shaft or crank shaft in the engine. For a six cylinder engine, used in the preferred embodiment, the cam gear located on the cam shaft comprises six evenly spaced teeth with a seventh tooth located between two of the cam gear teeth for detecting the TDC location of the cam gear. Each of the six evenly spaced teeth correspond to one cylinder firing. The seventh tooth is located just before the TDC of the cam gear. Hence the seventh tooth is positioned halfway between the last tooth and TDC to indicate the occurrence of a complete combustion cycle. When the cam angle detector detects the seventh tooth during rotation of the cam gear, it can reset processor 611 to determine the number of each cylinder firing subsequent to the detection of the seventh tooth. Thus, the processor 611 can identify which cylinder has fired or misfired at any time during a combustion cycle.

After detecting a misfire or low power event, a user may determine which cylinders have misfired via a conventional audio or visual device attached to the processor output. This information may prove to be important to a technician, for example, when testing an internal combustion engine using the engine cylinder misfire detection system of the present invention.

In one embodiment, a pressure threshold is determined with respect to engine operation for providing a minimum pressure value which must not be exceeded by the peak pressure for a monitored cylinder in order for the system to declare a complete or partial misfire. The pressure threshold represents a percentage or an absolute pressure which is subtracted from the running average peak pressure at the end of a complete combustion cycle to determine the minimum pressure value which may vary for each combustion cycle. Sensors 607 are placed in or on the engine to sample data for calculating a pressure threshold based on various engine parameters. Existing engine sensors may be used, however, to detect these engine operation parameters.

In calculating the optimum threshold value, certain engine operating parameters should take precedence over other parameters. For example, the most important engine operation parameter that is used to calculate an optimum pressure threshold is the fuel consumption rate. In essence, by monitoring the amount of fuel that is used in each cylinder during a combustion cycle, the user can accurately detect abnormalities in fuel consumption. Variations in fuel consumption may be reflected in the pressure threshold to indicate whether an engine cylinder misfire has occurred. The second most important engine operation parameter would be the engine speed. Based on the speed of the engine, specifically the rotation of the cam shaft, a user could also detect whether there are abnormalities in engine cylinder firing. A decrease in the engine speed, for example, may indicate that an engine cylinder has misfired. Thus, this information is important in calculating an accurate pressure threshold to detect the misfire of an engine cylinder. The coolant temperature is used to determine whether to test for engine cylinder misfires. When the engine is cold, as determined by the coolant temperature, processor 611 does not test for engine cylinder misfires. Nevertheless, when the coolant temperature has reached a predetermined temperature, a signal is sent to the processor 611 to test for engine cylinder misfires.

The fuel consumption rate is determined and stored in memory at the preproduction stage. This measurement is used to determine the actual fuel consumption rate in a spark-ignited natural gas engine as a percentage of the fuel rate at 100 percent load. The actual fuel consumption rate is determined using a gas mass flow sensor and/or other sensors which indicate the amount of fuel entering the engine and determine the air/fuel ratio. The gas mass flow sensor monitors the volume of gas or fuel flowing into the engine cylinders. An exhaust gas oxygen sensor may also be used in the present invention to monitor the residual oxygen escaping from the engine to provide feedback on the amount of fuel which has combusted. Intake air pressure and intake air temperature sensors may be used to determine the mass of air that enters the engine cylinders to ultimately determine the air/fuel ratio. The fuel consumption rate data is stored in the processor memory 612 and used to calculate a pressure threshold. If fuel consumption in the engine increases, the pressure threshold would also increase due to the increased pressure developed in the exhaust as a result of the excess fuel combustion.

An alternative method of determining the air/fuel ratio is to monitor the average peak exhaust manifold pressure during a combustion cycle. The average peak exhaust manifold pressure increases as the fuel entering the engine is leaned out. Thus, the increase in the average peak exhaust manifold pressure provides an indication of the air/fuel mixture entering the engine at a given time. Because the air/fuel ratio provides an indication of the amount of fuel consumed during a combustion cycle, this ratio is used in determining the fuel consumption rate at engine load.

The engine speed is sampled by positioning a sensor to monitor the rotation of the cam shaft. Engine speed is determined by sampling the speed between each tooth of the cam gear as the cam shaft rotates. Hence, when all six teeth have completed one rotation, the sensor has sampled engine speed data for each cylinder for a complete combustion cycle. The sampled data is stored in the processor memory 612 and used to calculate an optimum threshold value. As the engine speed increases, a higher threshold value is required to compensate for the increased exhaust pressure resulting from the increased engine speed. This result occurs due to the increase in average peak pressure with respect to speed and load which increases the pressure threshold as the speed increases.

The coolant temperature sensor 610 monitors the temperature of the coolant as it travels out of the engine to the radiator. Thus, the sensor is positioned in the fluid line which connects the engine to the radiator. As stated above, this sensor determines when to begin testing for engine cylinder misfires. Once the coolant temperature reaches a predetermined level, the processor 611 begins to test for engine cylinder misfires by sampling the average peak exhaust manifold gas pressures. If the sampled data reflects a high coolant temperature, the optimum pressure threshold value will be increased to compensate for the variability of the engine coolant temperature.

The engine speed and fuel consumption rate data are provided to optimum threshold calculation module 605 to calculate an optimum threshold level. The stored engine sensor data is used to calculate the optimum threshold value by indexing the sensed information into a three-dimensional table or data register stored in the optimum threshold calculation module 605. The three dimensional data register includes predetermined pressure threshold values that vary based on the calculated engine speed and fuel consumption rate data. A predetermined pressure threshold value is calculated while running the engine in a testing cell. By conducting tests at different pressures and fuel rates, a pressure threshold value can be determined for specific engine operating parameters. This threshold value is based on the desired minimum pressure value which represents the lowest pressure level at which the engine operates efficiently as determined by the user. As discussed above, in a spark-ignited natural gas engine, the fuel is leaned out until a misfire occurs and then fuel is added to the air/fuel mixture to a point just above misfire to allow the engine to operate efficiently. This is represented in the present invention as the minimum pressure value. The optimum threshold value may be represented as a numerical value or a percentage or an absolute pressure.

In the first embodiment, the optimum pressure threshold is the difference between the average peak pressure and the minimum pressure value. As the engine operating parameters change, so does the pressure threshold to compensate for the engine operating variations and still maintain a desired minimum pressure value. The pressure threshold percentage should be between 15 to 30 percent based on the engine operation parameters. For example, if the engine speed is 2500 rpm and the fuel rate is 5 milliliters per second during a combustion cycle, a pressure threshold percentage may be determined during testing to represent the variation in pressure required to compensate for the sensed engine conditions. If the average peak pressure is 50 PSI and the calculated pressure threshold is 30 percent, the minimum pressure value would be 35 PSI. As an absolute pressure, the pressure threshold in this example would be 15 PSI. If the sensed engine speed increases, however, a higher pressure threshold may be needed to account for the variation in pressure as a result of the engine speed increase.

In the second embodiment, the optimum threshold is an pressure differential between the peak exhaust pressure and the average exhaust pressure that represents an acceptable combustion event. When the difference between the peak exhaust pressure and the average exhaust pressure exceeds the optimum pressure differential, the combustion event is flagged as qualifying at least as a low power event. As in the case of the pressure threshold utilized in the first embodiment, the optimum pressure differential changes as the engine operating parameters change.

In the third embodiment, the optimum threshold is the equivalent coefficient of variation threshold value for a normal combustion event at a particular engine operating condition. For example, the coefficient of variation for an engine operating normally at 3000 RPM is between 0.2 and 0.4. As the engine operating condition changes, so does the acceptable limit for the coefficient of variation. When the computed coefficient of variation falls outside of the acceptable limit, either a high power or a low power combustion event has occurred. As stated earlier, a second test must be performed to properly characterize each coefficient of variation as either a high or a low power event.

One skilled in the art should appreciate that the optimum threshold value may be calculated using only one or two of the engine operation parameters. The optimum threshold is calculated in optimum threshold calculation module 605 and sent to misfire detection module 606 to for further calculations.

Figure 7:
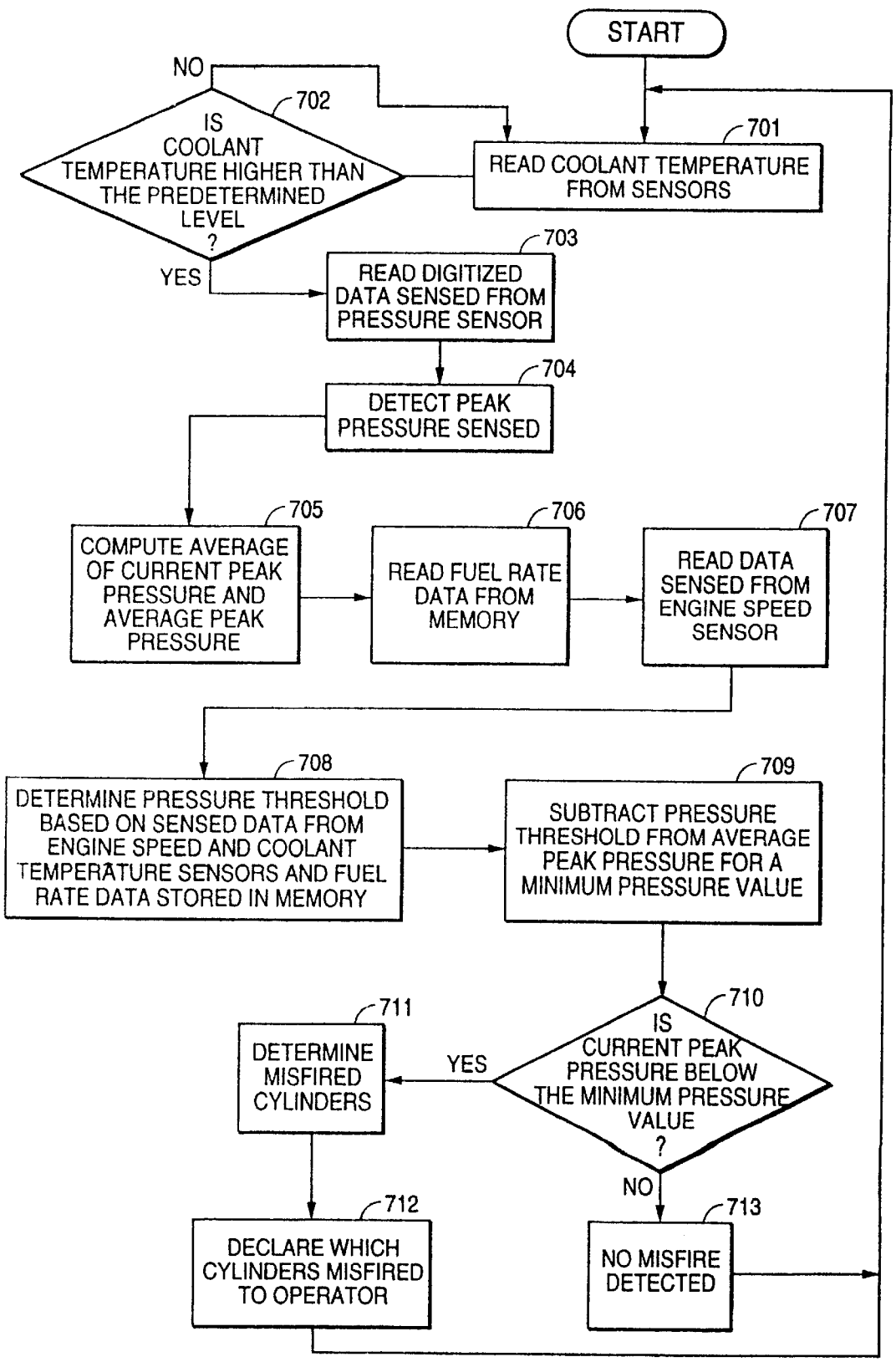
FIG. 7 is a flowchart of a software algorithm used to determine the occurrence of a misfire based on the calculated running average peak pressure and pressure threshold in accordance with the present invention.

Misfire detection according to the first embodiment of the present invention is shown in FIG. 7 which depicts a flowchart of a process implemented by software in processor 611 for determining the occurrence of a misfire based on the calculated average peak pressure and pressure threshold. The process begins in block 701, where the coolant temperature is sensed to determine whether to activate processor 611 to detect engine cylinder misfires. If the coolant temperature is above a predetermined level such as 50 degrees fahrenheit, processor 611 will activate the engine cylinder misfire detection process, as shown in step 702. If not, then the coolant temperature will continue to be monitored to determine if the temperature meets or exceeds the predetermined level. In block 703, data sampled by pressure sensor 126 is read into processor 611, both shown in FIG. 6. The peak pressure for each cylinder firing is determined in block 704 and the data is stored in processor memory 612. The processor then computes a new running average of peak pressures based on the current peak pressure (for one cylinder firing) and the previously calculated average peak pressure (for at least two cylinder firings) in block 705. In block 706, processor 611 reads the fuel consumption rate data from memory 612. The data sampled from the engine speed sensor is then read by processor 611 in block 707. Next, processor 611 determines a pressure threshold, based on data sensed from engine operation sensors 607, and subtracts the pressure threshold from the average peak pressure to determine a minimum pressure value. The processor 611 then compares the peak pressure for each cylinder with the minimum pressure value to determine if a misfire has occurred. The pressure threshold is calculated in block 708 based on the data read in blocks 706 and 707. The pressure threshold is subtracted from the average peak pressure in block 709 to yield a minimum pressure value. If the sensed peak pressure for any cylinder is below the minimum pressure value, determined in block 710, then the processor 611 determines the number of the misfiring cylinder in block 711. The engine cylinder misfire data is then presented to the operator or stored for later retrieval in block 713. If the current peak pressure is not below the minimum pressure value, no misfire is detected, as shown in block 713, and the processor proceeds to read data from the coolant temperature sensor, in block 701, for another combustion event.

An engine cylinder misfire is declared when the exhaust manifold pressure sensed after a cylinder firing is below a minimum pressure value which is calculated and compared to the peak exhaust pressure for each cylinder in misfire detection module 606. The minimum pressure value represents the lowest pressure level at which the engine can efficiently operate based on the exhaust pressure and engine operation parameters sensed during a combustion cycle. For example, if the average peak exhaust pressure is 50 PSI and the pressure threshold is 10 percent, then the minimum pressure value is 45 PSI. Any sensed peak exhaust manifold pressure below 45 PSI would be declared a misfire because at 45 PSI and above sufficient cylinder combustion exists for the engine to operate efficiently. A user of the present invention may determine the level of efficiency at which they desire an engine to run. This level of efficiency may be varied based on the calculated pressure threshold. When the exhaust pressure for a cylinder drops below the level of efficiency, a misfire is declared and recorded in the processor memory 612.

Figure 7A:
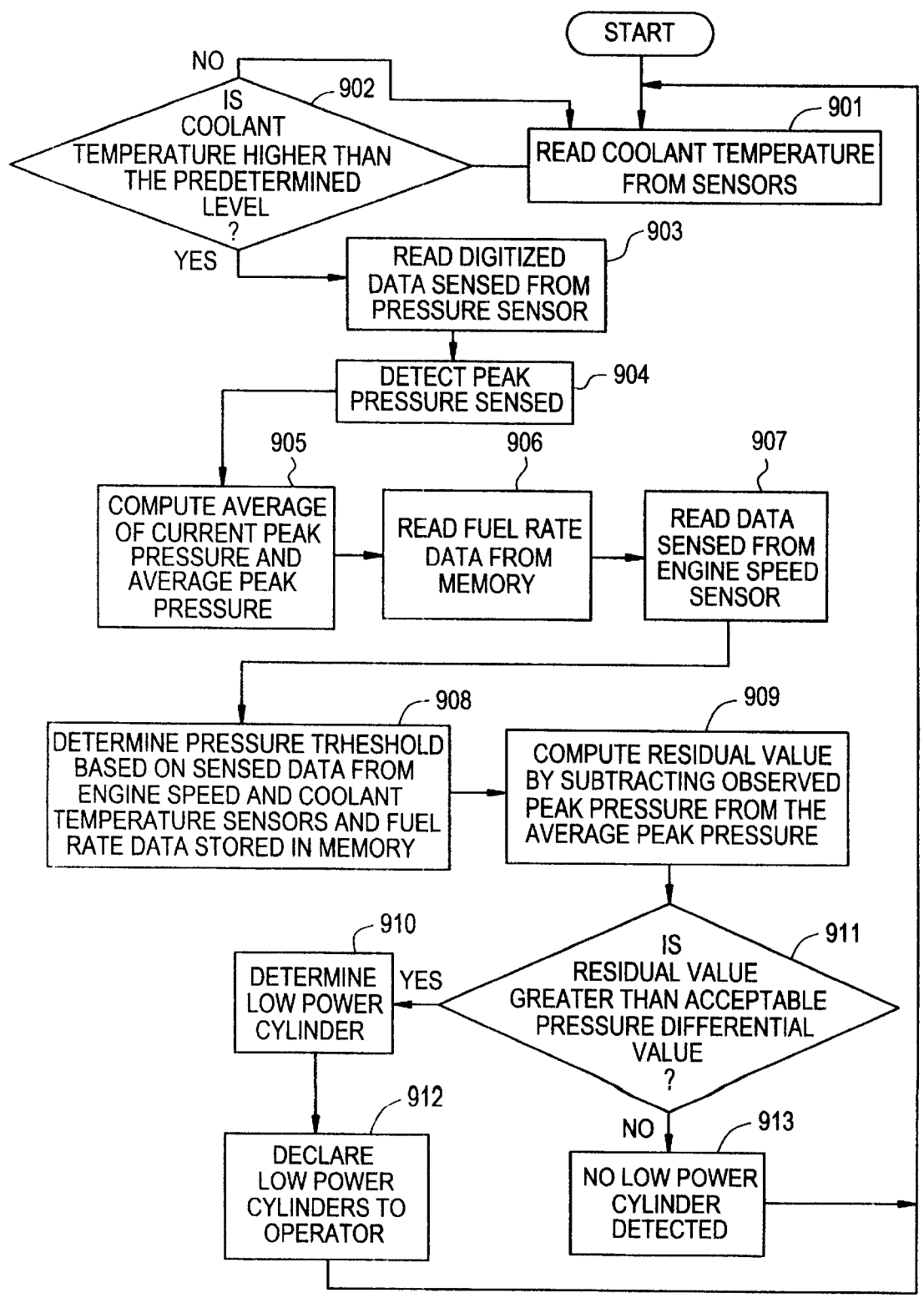
FIG. 7a is a flowchart of a software algorithm used to determine the occurrence of a misfire based on the calculated residual value and pressure threshold in accordance with the present invention.

Misfire detection according to another embodiment of the present invention is shown in FIG. 7a which depicts a flowchart of a process implemented by software in processor 611 wherein a misfire event is declared when the difference between an observed peak pressure value and a running average of peak pressures is greater than that found during a normal combustion. The process in blocks 901–907 are identical to the actions performed in blocks 701–707 as described in the previous flowchart. For the sake of brevity, the description of this process will begin with block 908. In block 908, the processor 611 computes an optimum residual value by calculating an optimum average pressure and an optimum peak pressure value from the detected operating characteristics of the internal combustion engine. Next, in block 909, the processor 611 computes an observed residual value by subtracting the observed peak pressure from the average peak pressure. The processor 611 in block 911, then compares the observed residual value for each cylinder with the optimum residual value computed in block 908. If the observed residual value is greater than the optimum residual value, then the processor 611 determines the number of the misfiring cylinder in block 910. The cylinder misfire data is then presented to the operator or stored for later retrieval in block 912. If the observed residual value is not greater than the optimum residual value, no misfire cylinder is detected, as shown in block 913, and the processor proceeds to read data from the coolant temperature sensor in block 901, for another combustion event.

Figure 7B:
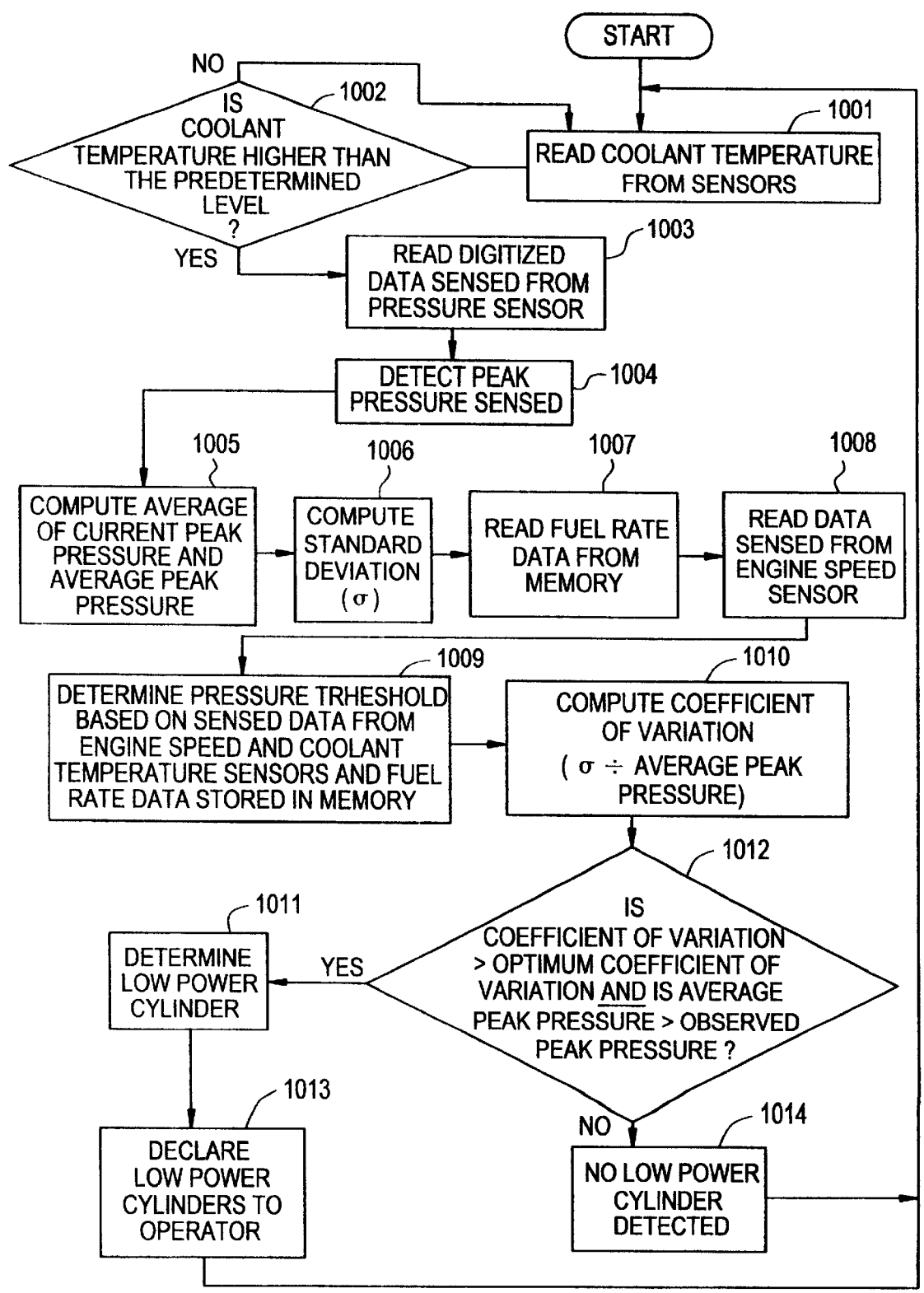
FIG. 7b is a flowchart of a software algorithm used to determine the occurrence of a misfire based on the coefficient of variation and pressure threshold in accordance with the present invention.

Misfire detection according to yet another embodiment of the present invention is shown in FIG. 7b which depicts a flowchart of a process implemented by software in process 611 wherein statistical comparisons of peak and mean pressure readings between subsequent firings of the same cylinder determine the existence of a low power or misfire event. The process in blocks 1001–1005 are identical to the actions performed in blocks 701–705 as described in FIG. 7. For the sake of brevity, the description of this process will begin with block 1006. In block 1006, the processor 611 computes a standard deviation between the last observed peak pressure and the average peak pressure for that cylinder. In block 1007, processor 611 reads the fuel consumption rate data from memory 612. The data sampled from the engine speed sensor is then read by processor 611 in block 1008. In block 1009, the processor 611 computes an optimum standard deviation and an optimum average pressure from the detected operating characteristics of the internal combustion engine. The processor then calculates an optimum coefficient of variation by dividing the optimum standard deviation by the optimum average pressure. Next, in block 1010, processor 611 computes an observed coefficient of variation based on the data computed in steps 1005 and 1006. The observed coefficient of variation is then compared to the optimum coefficient of variation calculated in block 1009 and the average peak pressure is compared to the observed peak pressure. If the coefficient of variation is greater than the pressure threshold and the average peak pressure is greater than the observed peak pressure, then the processor determines the number of the misfiring cylinder in block 1011. The cylinder misfire data is then presented to the operator or stored for later retrieval in block 1013. If the coefficient of variation is not greater than the pressure threshold or the average peak pressure is not greater than the observed peak pressure, no misfire cylinder is detected, as shown in block 1014, and the processor proceeds to read data from the coolant temperature sensor in block 1001, for another combustion event.

Once an engine cylinder misfire has been detected, an operator could use the data stored in processor 611 memory to optimize the performance of an internal combustion engine by adjusting various engine parameters. The data may also be used as an input to other engine control algorithms to enhance engine operation functions. For example, engine misfire detection data may be used to optimize the air/fuel ratio, spark timing, spark energy, multiple sparks, wastegate control, variable geometry turbo control and other related engine functions.

Figure 8:
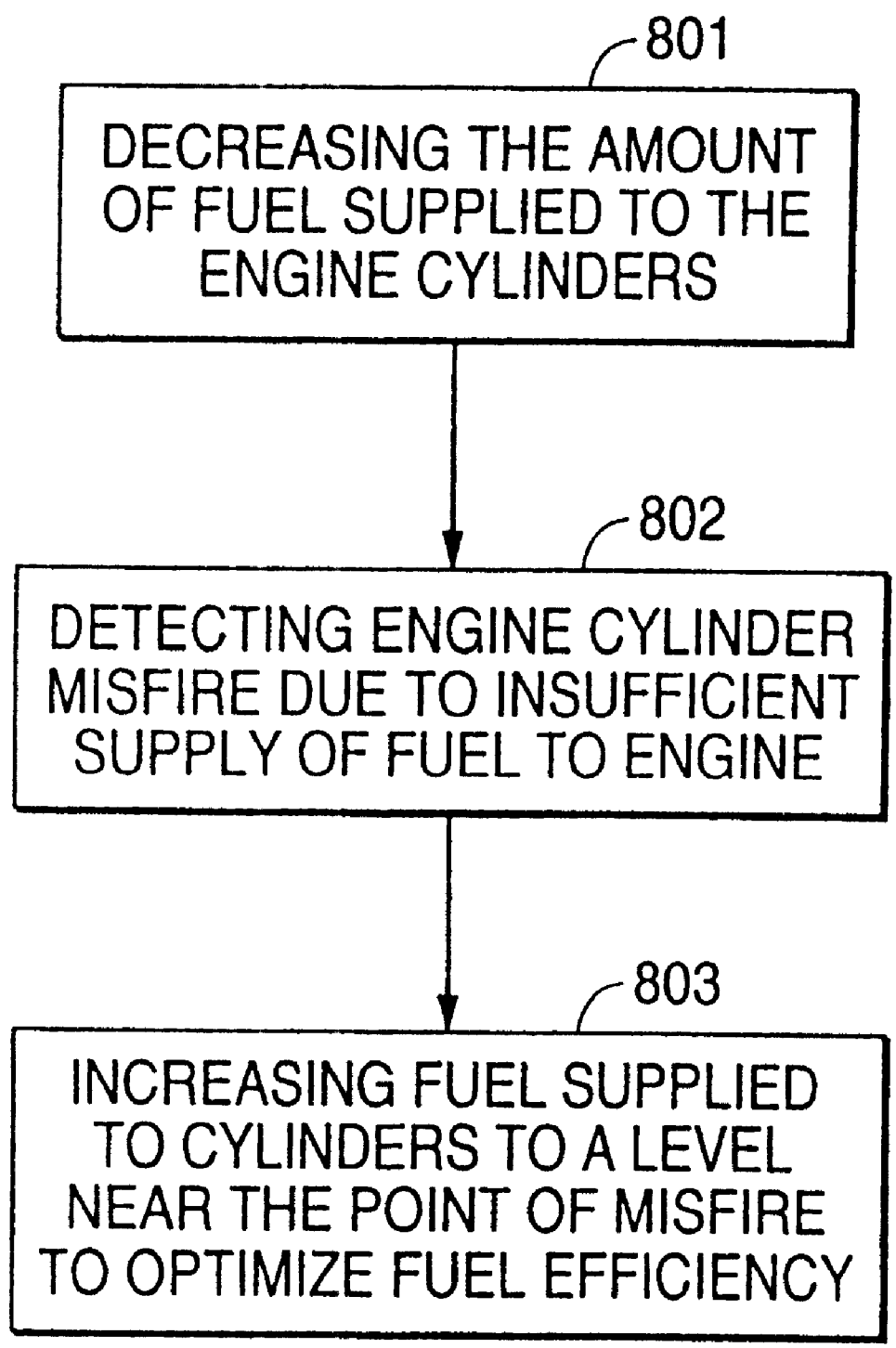
FIG. 8 illustrates a process of obtaining optimal fuel efficiency using the system and method of determining engine cylinder misfire of the present invention.

FIG. 8 illustrates a process of obtaining optimal fuel efficiency using the system and method of determining engine cylinder misfire of the present invention. In the preferred natural gas environment, the spark-ignited engine will operate at a steady state speed while the fuel is slowly leaned out until an engine misfire occurs, as shown in block 801. Engine cylinder misfire is then detected using the engine cylinder misfire detection system of the preferred embodiment, as shown in block 802. After the misfire occurs, the fuel is then minimally increased to a level near the misfiring point to enable the engine to run as lean as possible, as shown in block 803. Operating the natural gas engine near the misfire point greatly improves fuel efficiency and economy.

The system described herein detects engine misfires continuously when a vehicle is in operation. By detecting misfires efficiently and accurately as described above, the present invention provides a system and method to reduce engine wear using a cost effective approach.

While the invention has been described with reference to the aforementioned embodiments, it should be appreciated by those skilled in the art that the invention may be practiced otherwise than as specifically described herein without departing from the spirit and scope of the invention. It is therefore understood that the spirit and scope of the invention be limited only by the appended claims.

Industrial Applicability

The system and method for detecting engine cylinder misfire in internal combustion engines would be useful in any environment where a user desires to constantly monitor the average peak exhaust gas pressure during a combustion cycle and the operational characteristics of an engine to determine when engine operation is abnormal or outside of prescribed tolerances, such as with stationary power sources and vehicle engines.

What is claimed is:

1. A system for detecting an engine cylinder misfire in an internal combustion engine comprising:

pressure sensing means mounted in an exhaust manifold of the internal combustion engine for sensing the peak pressure of the exhaust gas flowing through said exhaust manifold;

engine operation detecting means for detecting operating characteristics of the internal combustion engine, said operating characteristics including at least one of the rotational speed, fuel consumption rate and coolant temperature of the internal combustion engine; and data processing means connected with said engine operation detecting means and said pressure sensing means for receiving the sensed pressure from said pressure sensing means for calculating a minimum pressure value based on the values of said operating characteristics measured by said engine operation detection means and for comparing said sensed pressure with said minimum pressure value to determine if an engine cylinder misfire has occurred.

2. The system of claim 1 wherein said engine operation detecting means includes a sensing means for monitoring and sensing said operating characteristics in real-time.

3. The system of claim 1 wherein said data processing means includes a memory means for storing data sensed from said pressure sensing means and said engine operating detecting means.

4. The system of claim 1 wherein said data processing means includes an average exhaust pressure calculating means for calculating the average exhaust pressure sensed by said pressure sensing means for each cylinder of said internal combustion engine during a complete combustion cycle.

5. The system of claim 4 wherein said data processing means includes a minimum pressure value calculating means for calculating a minimum pressure value by first calculating a pressure threshold using said detected operating characteristics of the internal combustion engine and subtracting said pressure threshold from said average exhaust pressure to yield said minimum pressure value.

6. The system of claim 4 wherein said data processing means includes a running average calculating means which averages an average exhaust pressure value determined by said average exhaust pressure calculating means and a current exhaust pressure value to yield a running average exhaust pressure value, said running average exhaust pressure value replacing said average exhaust pressure value after each cylinder firing.

7. The system of claim 1 wherein said pressure sensing means includes a peak pressure sensing means for sensing the highest pressure released from each cylinder of said internal combustion engine during each combustion cycle.

8. The system of claim 1 further comprising analog-to-digital converter means connected with said pressure sensing means and said data processing means for receiving an analog electrical signal representative of the pressure in said exhaust path from said pressure sensing means, for converting said analog electrical signal to a digital signal, and for providing said digital signal to said data processing means.

9. The system of claim 8 further comprising a peak detection means connected with said analog-to-digital converter means for receiving said digital signal and for determining the maximum sensed pressure based on said digital signal for each cylinder of the internal combustion engine during a normal combustion cycle.

10. The system of claim 1, wherein said pressure sensing means is a gauge-type pressure sensor.

11. The system of claim 10, wherein said gauge-type pressure sensor is a piezoelectric sensor.

12. The system of claim 10, wherein said gauge-type pressure sensor is a capacitive ceramic sensor.

13. The system of claim 1, wherein said pressure sensing means includes a single pressure sensor.

14. The system of claim 1, wherein said data processing means includes a cylinder number detecting means for detecting which cylinder has fired or misfired during a combustion cycle.

15. A method of detecting an engine cylinder misfire in an internal combustion engine comprising the steps of:
   detecting the exhaust gas pressure generated by the internal combustion engine;
   detecting operating characteristics of the internal combustion engine, said operating characteristics including at least one of the rotational speed, fuel consumption rate and coolant temperature of the internal combustion engine;
   calculating a minimum pressure value corresponding to said operating characteristics;
   comparing said minimum pressure value to the exhaust gas pressure; and
   generating a signal indicating if said exhaust gas pressure is less than said minimum pressure value to declare the occurrence of an engine cylinder misfire.

16. The method of claim 15, wherein said step of calculating the minimum pressure value includes the step of calculating an average exhaust pressure for a complete combustion cycle and the step of calculating a pressure threshold using said operating characteristics of the internal combustion engine and subtracting the pressure threshold from said average exhaust gas pressure to yield said minimum pressure value.

17. The method of claim 15 further comprising the step of detecting an engine cylinder number for determining which cylinder has fired or misfired during a combustion cycle.

18. The method of claim 15 further comprising the step of detecting an air/fuel ratio for determining the air to fuel mixture entering each cylinder during a combustion cycle.

19. A method of detecting an engine cylinder misfire in an internal combustion engine to determine an optimal level of engine operation comprising the steps of:
   decreasing the amount of fuel supplied to one or more cylinders of an internal combustion engine to cause an engine cylinder misfire;
   detecting said engine cylinder misfire in said internal combustion engine caused by an insufficient supply of said fuel by calculating a minimum pressure value corresponding to at least one of the rotational speed, fuel consumption rate and coolant temperature of the internal combustion engine and comparing said minimum pressure value to a measured exhaust gas pressure;
   generating a signal indicating if said exhaust gas pressure is less than said minimum pressure value to declare the occurrence of an engine cylinder misfire; and
   increasing said amount of fuel supplied to said one or more cylinders in response to said detected misfire to a level sufficient to enable said internal combustion engine to operate without the occurrence of engine cylinder misfires at an optimal fuel efficiency.

20. A system for detecting an engine cylinder misfire in an internal combustion engine comprising:
   a pressure sensor mounted in an exhaust manifold of the internal combustion engine;
   engine operation sensors positioned on or within the internal combustion engine for detecting the operating characteristics of the internal combustion engine, said operating characteristics including at least one of the rotational speed, fuel consumption rate and coolant temperature of the internal combustion engine; and
   a processor connected with said engine operation sensors and said pressure sensor for calculating a minimum pressure value to determine if an engine misfire has occurred, said processor comprising a comparison means for comparing the exhaust pressure sensed by said pressure sensor to said minimum pressure value to determine if an engine cylinder misfire has occurred.

21. The system of claim 20 wherein said pressure sensor is positioned in a passage which connects at least two of said exhaust paths of said internal combustion engine.

22. The system of claim 21 wherein said passage includes inlets at the ends of said passage, said inlets being smaller in diameter than the center area of said passage to restrict leakage of exhaust gases between said exhaust paths.

23. The system of claim 21 wherein said pressure sensor is offset from the center of said passage to prevent standing waves which may be generated within said passage.

24. The system of claim 20 further comprising an analog-to-digital converter connected with said pressure sensor and said processor for receiving an analog electrical signal representative of the pressure in said exhaust path from said pressure sensor, for converting said analog electrical signal to a digital signal, and for providing said digital signal to said processor.

25. The system of claim 20, wherein said pressure sensor is a gauge-type pressure sensor.

26. The system of claim 25, wherein said gauge-type pressure sensor is a piezoelectric sensor.

27. The system of claim 25, wherein said gauge-type pressure sensor is a capacitive ceramic sensor.

28. A system for detecting a partial or complete engine cylinder misfire in an internal combustion engine comprising:

pressure sensing means mounted in an exhaust manifold of the internal combustion engine for sensing the peak pressure of the exhaust gas flowing through said exhaust manifold;

engine operation detecting means for detecting operating characteristics of the internal combustion engine, said operating characteristics including at least one of the rotational speed, fuel consumption rate and coolant temperature of the internal combustion engine;

data processing means connected with said engine operation detecting means and said pressure sensing means for receiving the sensed pressure from said pressure sensing means, for converting said sensed pressure into a cylinder exhaust value, for calculating an optimum threshold based on the values of said operating characteristics measured by said engine operation detection means and for comparing said cylinder exhaust value with said optimum threshold to determine if a partial or complete engine cylinder misfire has occurred.

29. The system of claim 28 further comprising analog-to-digital converter means connected with said pressure sensing means and said data processing means for receiving an analog electrical signal representative of the pressure in said exhaust path from said pressure sensing means, for converting said analog electrical signal to a digital signal, and for providing said digital signal to said data processing means.

30. The system of claim 28 wherein said engine operation detecting means includes a sensing means for monitoring and sensing said operating characteristics in real-time.

31. The system of claim 28 wherein said data processing means includes a memory means for storing data sensed from said pressure sensing means and said engine operating detecting means.

32. The system of claim 29 wherein said data processing means includes an average exhaust pressure calculating means for calculating the average exhaust pressure sensed by said pressure sensing means for each cylinder of said internal combustion engine during a complete combustion cycle.

33. The system of claim 32 wherein said data processing means includes an optimum threshold calculating means for calculating an optimum threshold by:

calculating an optimum threshold value based on the values of said operating characteristics measured by said engine operation detecting means; and subtracting said average exhaust pressure from said optimum threshold to yield said optimum threshold.

34. The system of claim 33 wherein said data processing means includes a sensed pressure conversion means for converting said sensed pressure into a cylinder exhaust value by receiving said digital signal and for determining the maximum sensed pressure based on said digital signal for each cylinder of the internal combustion engine during a normal combustion cycle to yield a cylinder exhaust value.

35. The system of claim 32 wherein said data processing means includes an optimum threshold calculating means for calculating an optimum threshold by:

calculating an optimum average pressure and an optimum peak pressure value using said detected operating characteristics of the internal combustion engine; and calculating an optimum threshold for each cylinder by subtracting said optimum peak pressure from said optimum average exhaust pressure.

36. The system of claim 32 wherein said data processing means includes a sensed pressure conversion means for converting a sensed pressure by:

receiving said digital signal and for determining the maximum sensed pressure based on said digital signal for each cylinder of the internal combustion engine during a normal combustion cycle to yield a maximum sensed pressure; and subtracting said maximum sensed pressure from said average exhaust pressure to yield said cylinder exhaust value.

37. The system of claim 32 wherein said data processing means includes a standard deviation calculation means that computes a standard deviation between a peak pressure and an average exhaust pressure.

38. The system of claim 37 wherein said data processing means includes an optimum threshold calculating means for calculating an optimum threshold by:

calculating an optimum standard deviation and an optimum average pressure using said detected operating characteristics of the internal combustion engine; and calculating an optimum threshold by dividing said optimum standard deviation by said optimum mean to yield said optimum threshold.

39. The system of claim 38 wherein said data processing means includes a sensed pressure computing means for computing said sensed pressure by:

receiving said digital signal and for determining the maximum sensed pressure based on said digital signal for each cylinder of the internal combustion engine during a normal combustion cycle to yield a maximum sensed pressure; and calculating a standard deviation between said maximum sensed pressure and said average exhaust pressure;

calculating a cylinder exhaust value by dividing said standard deviation by said average exhaust pressure to yield said cylinder exhaust value.

40. The system of claim 32 wherein said data processing means includes a running average calculating means which averages an average exhaust pressure value determined by said average exhaust pressure calculating means and a current exhaust pressure value to yield a running average exhaust pressure value, said running average exhaust pressure value replacing said average exhaust pressure value after each cylinder firing.

41. The system of claim 28 wherein said pressure sensing means includes a peak pressure sensing means for sensing the highest pressure released from each cylinder of said internal combustion engine during each combustion cycle.

42. The system of claim 28, wherein said pressure sensing means is a gauge-type pressure sensor.

43. The system of claim 42, wherein said gauge-type pressure sensor is a piezoelectric sensor.

44. The system of claim 42, wherein said gauge-type pressure sensor is a capacitive ceramic sensor.

45. The system of claim 28, wherein said pressure sensing means includes a single pressure sensor.

46. The system of claim 28, wherein said data processing means includes a cylinder number detecting means for detecting which cylinder has completely fired, partially or completely misfired during a combustion cycle.

47. A method in an internal combustion engine for detecting a full or partial engine cylinder misfire, the internal combustion engine comprised of a pressure sensing means mounted in an exhaust manifold and connected to an engine operation detecting means that is further connected to a data processing means, the method comprising the steps of:
  sensing the peak pressure of exhaust gas generated by the internal combustion engine;
  converting the sensed pressure into a cylinder exhaust value;
  detecting operating characteristics of the internal combustion engine, said operating characteristics including at least one of the rotational speed, fuel consumption rate and coolant temperature of the internal combustion engine;
  calculating an optimum threshold corresponding to said operating characteristics; and
  comparing said cylinder exhaust value with said optimum threshold to determine if a partial or complete engine cylinder misfire occurred.

48. The method of claim 47 wherein said step of converting said sensed pressure into a cylinder exhaust value comprises the step of receiving said digital signal and for determining the maximum sensed pressure based on said digital signal for each cylinder of the internal combustion engine during a normal combustion cycle to yield a cylinder exhaust value.

49. The method of claim 47 wherein said step of calculating an optimum threshold comprises the steps of:
  calculating an optimum threshold value based on the values of said operating characteristics measured by said engine operation detecting means; and
  subtracting said average exhaust pressure from said optimum threshold to yield said optimum threshold.

50. The method of claim 49 wherein said step of calculating an optimum threshold comprises the steps of:
  calculating an optimum average pressure and an optimum peak pressure value using said detected operating characteristics of the internal combustion engine; and
  calculating an optimum threshold for each cylinder by subtracting said optimum peak pressure from said optimum average exhaust pressure.

51. The method of claim 50 wherein said step of converting the sensed pressure into a cylinder exhaust value comprising the steps of:
  receiving said digital signal and for determining the maximum sensed pressure based on said digital signal for each cylinder of the internal combustion engine during a normal combustion cycle to yield a maximum sensed pressure value; and
  subtracting said maximum sensed pressure value from said average exhaust pressure to yield a cylinder exhaust value.

52. The method of claim 47 wherein said step of calculating an optimum threshold comprises the steps of:
  calculating an optimum standard deviation and an optimum average pressure using said detected operating characteristics of the internal combustion engine; and
  calculating an optimum threshold by dividing said optimum standard deviation by said optimum mean to yield said optimum threshold.

53. The method of claim 52 wherein said step of comparing said peak pressure with said optimum threshold comprises the steps of:
  calculating a standard deviation between said peak pressure and said average exhaust pressure;
  calculating a coefficient of variation by dividing said standard deviation by said average exhaust pressure to yield said coefficient of variation; and
  comparing said coefficient of variation to said optimum threshold and declaring at least a partial misfire if said coefficient of variation is greater than said optimum threshold and said average exhaust pressure is greater than said peak pressure.

54. The method of claim 47 further comprising the step of detecting an engine cylinder number for determining which cylinder has fired or misfired during a combustion cycle.

55. The method of claim 47 further comprising the step of detecting an air/fuel ratio for determining the air to fuel mixture entering each cylinder during a combustion cycle.

* * * * *